United States Patent [19]

Hornby

[11] Patent Number: 4,928,729
[45] Date of Patent: May 29, 1990

[54] FUEL PRESSURE REGULATOR VALVE

[75] Inventor: Michael J. Hornby, Yorktown, Va.

[73] Assignee: Siemens-Bendix Automotive Electronics L.P., Troy, Mich.

[21] Appl. No.: 336,363

[22] Filed: Apr. 11, 1989

[51] Int. Cl.⁵ ............................................ F16K 31/126
[52] U.S. Cl. ...................... 137/510; 123/512; 251/86
[58] Field of Search ............... 137/510; 251/86; 123/463, 512

[56] References Cited

U.S. PATENT DOCUMENTS

| | | | |
|---|---|---|---|
| 3,419,039 | 12/1968 | Monnich | 137/510 |
| 3,511,270 | 5/1970 | Fehrenbach et al. | 137/510 |
| 4,237,924 | 12/1980 | Benjamin et al. | 137/510 |
| 4,627,463 | 12/1986 | Johnstone | 137/510 |
| 4,653,528 | 5/1987 | Field et al. | 137/510 X |
| 4,825,835 | 5/1989 | Deweerdt | 123/463 |

FOREIGN PATENT DOCUMENTS 1286357  1/1969  Fed. Rep. of Germany ........ 251/86

Primary Examiner—Stephen M. Hepperle
Attorney, Agent, or Firm—George L. Boller; Russel C. Wells

[57] ABSTRACT

A fuel pressure regulator valve of the type commonly used in automobile fuel injection systems. The invention relates to improved retention of the valve element within the mount that is carried by the diaphragm assembly. The valve element is a truncated sphere and the retention is by means of a circular washer that fits into a circular recess formed in the mount around the cavity that contains the sphere. The truncated circular face of the sphere protrudes through the washer so that it can coact with the valve seat. The inside diameter of the washer is closely controlled and this controls the allowable travel of the sphere within the cavity. The washer is retained on the mount by crimping the edge of the circular recess over the outside diameter of the washer.

2 Claims, 2 Drawing Sheets

FUEL PRESSURE REGULATOR VALVE

BACKGROUND AND SUMMARY OF THE INVENTION

This invention relates generally to fuel pressure regulator valves of the type used in automobile engine fuel injection systems, and more specifically it relates to an improvement in retention of the diaphragm-carried valve element of such valves.

A common type of fuel pressure regulator valve comprises a housing in which a diaphragm assembly divides the housing into two chambers, one of which is a control chamber and the other of which is a fuel chamber. The fuel chamber has an inlet which is in communication with pressurized fuel whose pressure is to be regulated and an outlet through which excess fuel is returned to the tank. The diaphragm assembly carries a valve element that coacts with a valve seat that is disposed in the fuel chamber. The valve seat is provided on the inner end of the outlet from the fuel chamber. The control chamber controls the pressure of fuel in the fuel chamber that will cause unseating of the valve element from the valve seat and in this way regulates the pressure of the liquid fuel to which the inlet is communicated. The control chamber comprises a helical spring that acts on the diaphragm assembly such that the valve element is biased toward seating on the valve seat and hence toward blocking flow between the inlet and outlet. The control chamber further comprises a control port that is communicated to a vacuum control. Application of vacuum to the control chamber acts on the diaphragm assembly in the direction opposite that of the spring. By suitable control of the vacuum that is delivered to the control chamber, the pressure in the fuel chamber at which unseating of the valve element occurs is controlled. In this way, the valve performs the function of regulating the pressure of liquid fuel to which the fuel chamber inlet is exposed.

One known form of valve element comprises a truncated metal sphere which has an overall size greater than a hemisphere and which has a flat circular face at the truncation. The truncated sphere is retained on a metal mount carried by the diaphragm assembly such that it is the flat circular face that coacts with the valve seat and such that the truncated sphere is able to swivel within the mount. The swivelling capability assures that the flat circular face of the truncated sphere will properly seat on the valve seat to block fuel flow from the fuel chamber outlet when such blockage is intended. The truncated sphere is secured on the metal mount by disposing the sphere in a cavity formed in the mount and then swaging, or crimping, a flange that surrounds the cavity over the sphere.

This swaging, or crimping, is an operation that must be relatively carefully controlled because it is necessary for the sphere to have a certain limited amount of travel when captured within the cavity of the mount. Hence manufacturing tolerances must be carefully monitored during the manufacturing process, and adjustments made as required, so that each sphere is within the allowable limits of travel within the mount cavity after swaging. Such procedures have been found to contribute significantly to manufacturing cost.

Another known form of valve element comprises a circular disk that has been soldered to a fully spherical ball. The ball is captured within the mount cavity by a comparatively complex stamping, and the step of soldering the disk to the ball is an extra operation. Hence this construction has certain disadvantages.

The present invention relates to a new and unique construction for retaining a truncated spherical valve element in the mount cavity. Briefly, the construction comprises a circular recess that is disposed around the cavity opening and has a diameter exceeding that of the cavity opening, and a circular washer disposed within the circular recess to retain the truncated sphere within the cavity, wherein the circular washer has an inside diameter greater than the diameter across the circular face of the truncation but less than the nominal diameter of the sphere, and wherein a flange around the circular recess is crimped onto the outside diameter of the circular washer. The tolerance of the inside diameter of the washer is closely controlled to provide close control of the amount of travel of the sphere within the mount cavity. This construction provides manufacturing advantages over both types of prior valve elements described above.

The foregoing, along with additional features, advantages, and benefits of the invention, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
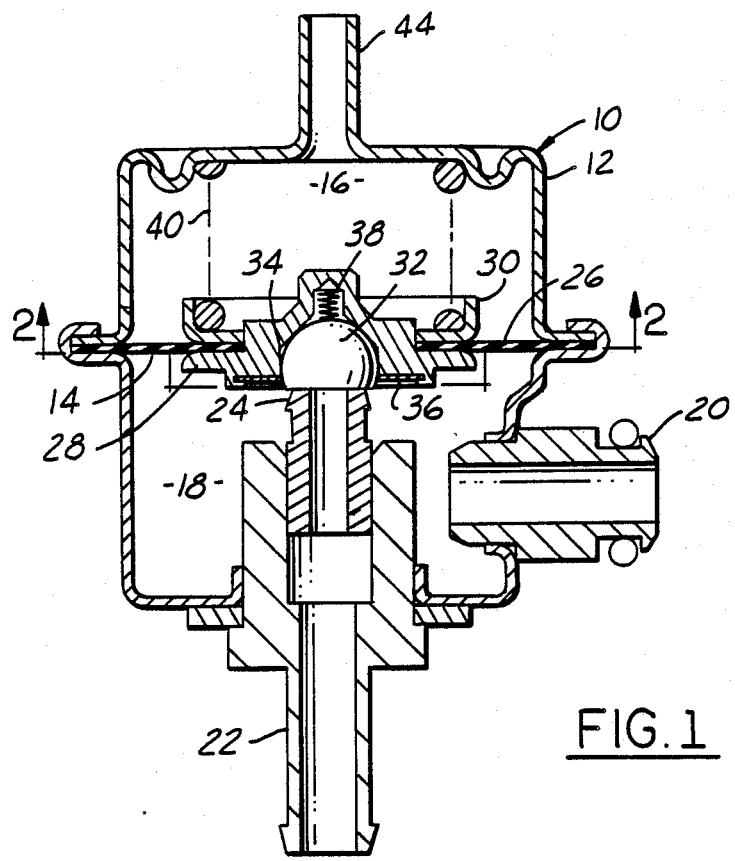
FIG. 1 is a longitudinal cross sectional view through a fuel pressure regulator valve according to the present invention.

FIG. 1 shows a fuel pressure regulator valve 10 embodying principles of the present invention and comprising a generally cylindrical housing 12 containing a diaphragm assembly 14 that divides the housing into a control chamber 16 and a fuel chamber 18.

Fuel chamber 18 has an inlet 20 adapted to be connected to a fuel rail (not shown) and an outlet 22 adapted to be connected to a fuel tank (not shown). A valve seat 24 is provided within fuel chamber 18.

Diaphragm assembly 14 comprises an annular nonmetallic element 26 whose inside diameter margin is captured between a metal mount 28 and an annular metal part 30. The diaphragm assembly further comprises a truncated metal sphere 32 that is captured within a cavity 34 of mount 28 by means of a circular washer 36. A small helical spring 38 within cavity 34 acts to urge sphere 32 against the inside diameter of washer 36.

Figure 2:
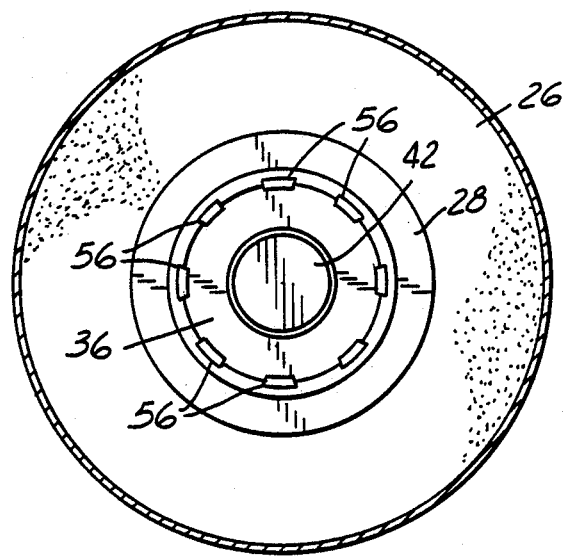
FIG. 2 is a transverse cross sectional view taken in the direction of arrows 2—2 in FIG. 1.

A helical spring 40 is disposed in chamber 16 and acts between the end wall of housing 12 and part 30 to urge the diaphragm assembly in a direction causing the truncated circular face 42 (FIG. 2) of sphere 32 to seat on valve seat 24. In this condition, flow between inlet 20 and outlet 22 is blocked.

Chamber 16 has a control port 44 that is adapted to be communicated to a vacuum control. When vacuum is applied to chamber 16, the vacuum acts counter to spring 40 to establish the pressure in chamber 18 at which sphere 32 unseats from seat 24. For a given vacuum in chamber 16, the extent to which sphere 32 is unseated from seat 24 is a function of the magnitude of pressure in chamber 18, the greater the pressure, the greater the unseating of sphere 32. The result is that the pressure of fuel in chamber 18 is regulated.

The inventive features relate to the manner in which sphere 32 is captured within cavity 34 by washer 36. The reader's attention is therefore also directed to FIGS. 3 and 4 which show the inventive features in greater detail.

Figure 3:
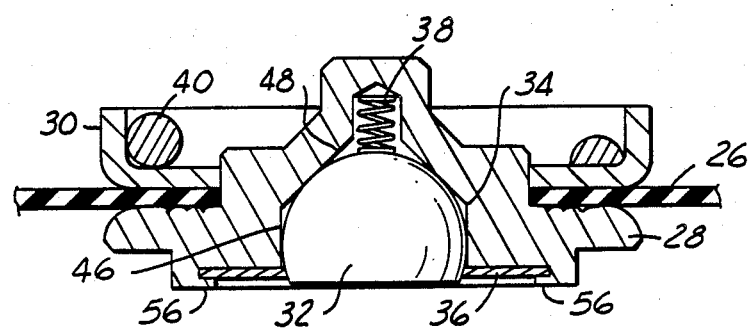
FIG. 3 is an enlarged fragmentary view of a portion of FIG. 1.
Figure 4:
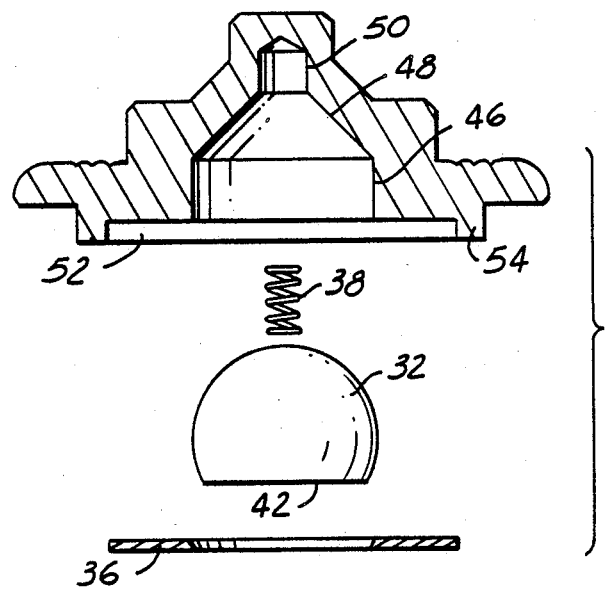
FIG. 4 is an exploded view of several of the parts shown in FIG. 3.

Cavity 34 has a straight circular cylindrical section 46, a frusto-conically tapered section 48 and a straight circular cylindrical section 50 that ends in a tapered tip. Sphere 32 is somewhat larger than a hemisphere and fits closely within sections 46 and 48, as shown in FIG. 3. The inside diameter of washer 36 is greater than the diameter of circular face 42 but less than the nominal diameter of sphere 32. Thus with washer 36 retaining sphere 32 within cavity 34, as shown in FIG. 3, spring 38 is urging the sphere against the inside diameter of the washer. The relative dimensions of the sphere and cavity are such that the sphere is capable of limited travel within the cavity and of swivelling within the cavity.

Washer 36 itself must be retained on mount 28 in order to retain sphere 32 within cavity 34. Washer retention is achieved by providing a circular recess 52 around the open end of section 46, disposing washer 36 in recess 52 after spring 38 and sphere 32 have been disposed in cavity 34, and then crimping a circular flange 54 surrounding the washer over the outer margin of the washer to provide the crimps, or upsets, 56 shown in FIGS. 2 and 3 which hold the washer in place.

Close control over the inside diameter of washer 36 will, for given dimensions of the sphere and that portion of the cavity occupied by the sphere, provide close control over the amount of travel of the sphere within the cavity. Although it is necessary for the outside margin of the washer to be held in place by crimping, the crimping operation and the control over the outside diameter of the washer are less critical than in the valve where the flange of the mount is crimped directly against the sphere. Hence, the invention provides an improvement in the assembly process.

While a preferred embodiment has been described, it will be appreciated that principles are applicable to other embodiments.

What is claimed is:

1. In a fuel pressure regulator valve comprising a housing containing a diaphragm assembly that divides the housing into two chambers, one chamber being a fuel chamber, and the other chamber being a control chamber, said fuel chamber having an inlet adapted to be communicated to a supply of pressurized fluid whose pressure is to be regulated and an outlet adapted to return excess fuel to a tank, said outlet having an inner end containing a valve seat with which a valve element carried by said diaphragm assembly coacts, said control chamber comprising means for establishing the pressure in said fuel chamber at which said valve element unseats from said valve seat, said valve element being a truncated sphere having a circular flat face at is truncation and having a size greater than a hemisphere, said sphere being received within a cavity in a mount carried by said diaphragm assembly such that said circular face of said sphere is presented to coact with said valve seat while said sphere is capable of swivelling within said mount, and said valve seat being flat, the improvement in retaining said sphere within said mount which comprises a single flat washer having a circular inside diameter that is less than the nominal diameter of said sphere but greater than the diameter of said flat circular face, said mount containing a recess surrounding said cavity and within which the entirety of said washer is disposed, and means comprising staking means on said mount around said recess for engaging said washer and securing said washing to said mount such that said sphere can protrude through the inside diameter of said washer to present said flat circular face to said flat valve seat while the sphere remains capable of swivelling within said mount.

2. The improvement set forth in claim 1 including a spring disposed between the mount and sphere to resiliently urge the sphere into contact with the inside diameter of the washer.

* * * * *

UNITED STATES PATENT AND TRADEMARK OFFICE
CERTIFICATE OF CORRECTION

PATENT NO. : 4,928,729
DATED : May 29, 1990
INVENTOR(S) : Michael J. Hornby

It is certified that error appears in the above-identified patent and that said Letters Patent is hereby corrected as shown below:

Column 4, Line 20:
  Delete "is" and insert therefor -- its --.

Column 4, Line 35:
  Delete "washing" and insert therefor -- washer --.

Signed and Sealed this

Twenty-second Day of October, 1991

Attest:

HARRY F. MANBECK, JR.

*Attesting Officer*          *Commissioner of Patents and Trademarks*